United States Patent [19]

Hattori et al.

[11] Patent Number: 4,768,011

[45] Date of Patent: Aug. 30, 1988

[54] JOINT STRUCTURE FOR DIAMOND BODY AND METALLIC BODY

[75] Inventors: Yutaka Hattori, Takatsuki; Novuei Ito, Okazaki; Kazuhiro Inoguchi, Okazaki; Tadashi Hattori, Okazaki, all of Japan

[73] Assignee: Nippon Soken, INC., Nishio, Japan

[21] Appl. No.: 946,478

[22] Filed: Dec. 24, 1986

[30] Foreign Application Priority Data

Dec. 24, 1985 [JP] Japan ................................ 60-291194
Dec. 24, 1985 [JP] Japan ................................ 60-291193
Dec. 26, 1985 [JP] Japan ................................ 60-295813

[51] Int. Cl.⁴ ............................................... G01L 1/22
[52] U.S. Cl. .......................................... 338/5; 338/2; 338/308
[58] Field of Search ................................. 338/2–5, 338/22 R, 22 SD, 36, 47, 308, 309

[56] References Cited

U.S. PATENT DOCUMENTS 4,276,535 6/1981 Mitsuyu et al. ................. 335/309 X

FOREIGN PATENT DOCUMENTS 55-103441 8/1980 Japan .
59-232991 12/1984 Japan .

Primary Examiner—E. A. Goldberg
Assistant Examiner—M. M. Lateef
Attorney, Agent, or Firm—Cushman, Darby & Cushman

[57] ABSTRACT

A pressure detector has a cylindrical housing projecting into an atmosphere the pressure of which to be measured, a pressure chamber formed within the housing, to which is the pressure to be measured is introduced, a metallic diaphragm formed on a surface of one portion of a wall defining the pressure chamber, which deforms in accordance with changes in the pressure which is to be measured, and a strain gauge provided in the diaphragm for generating an output signal corresponding to the strain generated due to the deformation of the diaphragm. The strain gauge is composed of a diamond monocrystal plate and a diamond semiconductor film formed on the diamond monocrystal plate. On the diamond monocrystal plate are piled a titanium film, a platinum film, and a gold film, in sequence. The gold film is joined to the diaphragm by brazing.

27 Claims, 4 Drawing Sheets

JOINT STRUCTURE FOR DIAMOND BODY AND METALLIC BODY

BACKGROUND OF THE INVENTION

1. Field of the Invention

The present invention relates to a joint structure for jointing a diamond body to a metallic body, and a pressure detector having a strain gauge made of diamond semiconductor, which makes use of this joint structure.

2. Description of the Prior Art

Conventionally, Si semiconductors have been used in many cases. However, the band gap of Si is as small as about 1.1 eV. This results in the semiconductor characteristic thereof disappearing when the ambient temperature is over about 150° C.

In contrast, the band gap of diamond is as large as about 5.5 eV as compared with that of Si. Therefore, diamond semiconductor is expected to be durable in a high temperature atmosphere.

Furthermore, diamond monocrystal is excellent in its electrically insulating characteristic and very large in its thermal conductivity. Therefore, diamond monocrystal is expected to exhibit excellent performance as a semiconductor base plate.

Recently, it has been strongly desired to directly detect the explosion stroke of each cylinder in the electronic fuel injection control(EFI) of a vehicle engine. And to this end, such a pressure detector as is capable of directly detecting the pressure within each cylinder has been demanded.

The pressure detector is generally provided with a pressure chamber for introducing a pressure to be measured into a housing projecting within an atmosphere to be measured. One portion of a wall defining the pressure chamber is composed of a diaphragm which deforms in accordance with the change of the pressure to be measured. To to this diaphragm is secured a strain gauge which generates an output signal corresponding to the strain of the diaphragm.

A semiconductor strain gauge has been noted as the strain gauge one to be considered for use in such an instance because of very good sensitivity. However, the usable temperature range of the Si semiconductor is low as described above. Therefore, it has heretofore been impossible to detect the pressure within engine cylinders of which the temperature exceeds 500° to 600° C.

Under the above circumstances, it can be proposed to use diamond of which the usable temperature is high, as the strain gauge. However, when the diamond monocrystal or semiconductor is installed in the pressure detector, there occurs a problem in joining it to the metallic body. Namely, the coefficient of thermal expansion of diamond is as small as about $2.3 \times 10^{-6}/°C$. at 100° C. When the diamond is joined to a metal such as stainless steel (coefficient of thermal expansion is about $15 \times 10^{-6}/°C$. at 100° C.), damages sometimes occur in the joint portions therebetween due to the change of temperature of an ambient atmosphere because of a large difference in coefficient of thermal expansion.

SUMMARY OF THE INVENTION

It is one object of the present invention to provide a joint structure capable of certainly and easily joining a diamond body to a metallic body without being affected by a large change of temperature at the site of its location.

It is another object of the present invention to provide a pressure detector having a novel structure having a diamond semiconductor strain gauge, which is capable of detecting the pressure within a high temperature atmosphere with high precision, using a particular joint structure.

The joint structure for joining a diamond body and a metallic body according to the present invention, has a titanium film formed on the diamond body and a gold film formed on the titanium layer and joined to the metallic body.

The pressure detector according to the present invention has a cylindrical housing projecting into an atmosphere in which the measurement is to be made, a pressure chamber formed within the housing, to which the pressure to be measured is introduced, a metallic diaphragm formed on the surface of one portion of a wall defining the pressure chamber, which deforms in accordance with the change of the pressure to be measured, and a strain gauge provided in the diaphragm for generating an output signal corresponding to the strain generated due to deformation of the diaphragm. The strain gauge is composed of a diamond monocrystal plate and a diamond semiconductor film formed on the diamond monocrystal plate. The diamond monocrystal plate is joined to the diaphragm through a titanium film and a gold film piled on the monocrystal plate in sequence.

In the above joint structure according to the present invention, the coefficients of thermal expansion of the titanium film and the gold film are $8.8 \times 10^{-6}/°C$., and $14.2 \times 10^{-6}/°C$. at 100° C., respectively. The coefficients of thermal expansion of these films are gradually increased from the film adjacent to the diamond monocrystal body or the diamond semiconductor. The gold film is joined to the metallic body(coefficient of thermal expansion is normally about $15 \times 10^{-6}/°C$. at 100° C.). This results in a difference in coefficient of thermal expansion between the diamond body, the titanium film, the gold film and the metallic body being decreased, and accordingly, the joint portions of the obtained joint structure being free from damage when the temperature in the vicinity of the detector is greatly changed.

In the above-described pressure detector, when the diaphragm is deformed due to the introduced pressure to be measured, strain is generated in the diamond semiconductor film and the resistance value of the diamond semiconductor film is greatly changed in accordance with the value of strain. The above-described introduced pressure can be detected from the obtained resistance value.

The band gap of the diamond semiconductor film is as large as about 5.5 eV. Therefore, the diamond semiconductor film can satisfactorily operate, maintaining the semiconducting characteristic at a temperature as high as not less than 500° C. The pressure detector according to the present invention, employing a strain gauge composed of the above described semiconductor film can directly detect the pressure in an engine cylinder.

BRIEF DESCRIPTION OF THE DRAWINGS

FIG. 1 is a sectional view illustrating an overall strain gauge taken along the line of I—I of FIG. 2;

FIG. 2 is a plan view of the overall strain gauge;

FIG. 3 is a connection diagram of the strain gauge;

FIG. 4 is a sectional view of an overall pressure detector;

FIG. 5 is a plan view of an overall strain gauge;

FIG. 6 is a sectional view of the strain gauge taken along the line of VI—VI of FIG. 5;

FIG. 8 is a sectional view of an overall pressure detector; and

FIG. 9 is a sectional view of an overall strain gauge.

DETAILED DESCRIPTION OF THE EMBODIMENTS

Hereinafter, the detailed structure of the pressure detector having a diamond semiconductor strain gauge using the joint structure according to the present invention will be explained.

Figure 4:
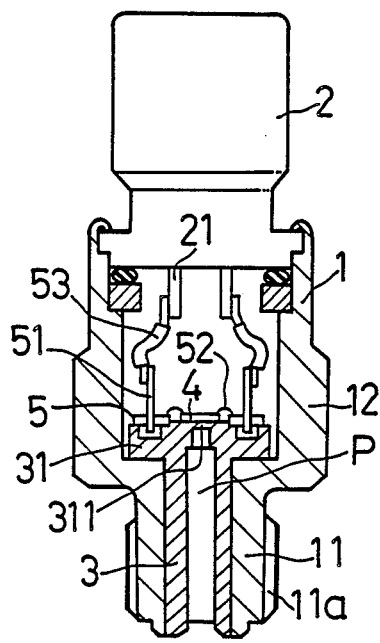

In the pressure detector in FIG. 4, a cylindrical housing 1 is provided with a screw portion 11a around its lower end portion 11 having a small diameter. An intermediate portion 12 has a hexagon shaped section. To an upper opening of the housing 1 is secured a connector 2 by caulking (i.e. squeeze-forming). A sensing body 3 is provided within the lower end portion 11 of the housing 1. The sensing body 3 is a cylindrical body having a closed end, which is made of stainless steel for forming a pressure chamber P. A flange portion 31 having a large diameter formed in the closed end of the sensing body 3 is made to come in contact with a stepped surface of the housing 1 while an open end thereof is positioned in a lower end of the housing 1.

A central portion of the flange portion 31 of the sensing body 3 is made thin to form a diaphragm 311. In an upper surface of the diaphragm 311 is provided a semiconductor strain gauge 4 having a structure described later. A ceramic base plate 5 is provided around the flange portion 31. A conductive paste is printed and fired on an upper surface of the base plate 5 to form a signal output electrode(not shown). Metallic posts 51 which are electrically connected with the output electrode, project from the ceramic base plate 5. The semiconductor strain gauge 4 is connected to the signal output electrode of the base plate 5 by means of a wire 52. Each metallic post 51 is connected to a pin 21 of the connector 2 by means of a lead wire 53.

Figure 2:
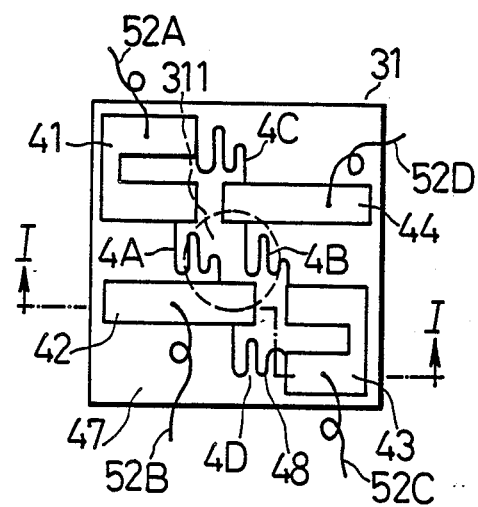
Figure 3:
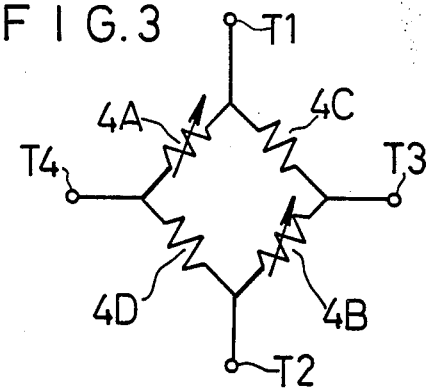

As shown in FIG. 2, the strain gauge 4 is composed of a single rectangular diamond monocrystal plate 47 and four strain gauges 4A, 4B, 4C and 4D formed on the diamond monocrystal plate 47. Each of the strain gauges 4A to 4D is composed of a meandering linear diamond semiconductor film 48 and these strain gauges 4A to 4D are connected to one another in sequence by means of rectangular face-shaped electrodes 41, 42, 43, 44. To each of the electrodes 41 to 44 is connected one end of each of wires 52A, 52B, 52C, and 52D. Whereby a strain gauges 4a to 4D compose a bridge circuit as shown in FIG. 3.

Figure 1:
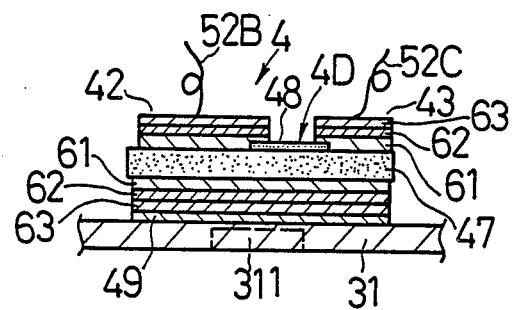
FIGS. 1 to 4 illustrate a first embodiment of a present invention.

The diamond monocrystal plate 47 is secured to an upper surface of the central portion of the flange portion 31 of the sensing body 3 as shown in FIG. 1. A titanium film 61, a platinum film 62 and gold film 63 are piled on the overall lower surface of the monocrystal plate 47 in sequence. The gold film 63 is joined and secured to the flange portion 31 through a brazing material 49. In this state, the strain gauges 4A, 4B are positioned directly above the diaphragm 311 (FIG. 2).

The diamond semiconductor film 48 formed on the diamond monocrystal plate 47 is a P-type semiconductor film containing boron(B) as an impurity.

Each of the electrodes 41 to 44 formed on the semiconductor film 48 is composed of another titanium film 61, another platinum film 62 and another gold film 63 which are piled on the semiconductor film 48 in sequence.

The above-described strain gauge 4 is produced as follows. Namely, the diamond monocrystal plate 47 masked except for the portions for forming the semiconductor film 48 is disposed within a microwave CVD device. A gas mixture composed of methane($CH_4$), hydrogen and a small amount(0.1 to 100 ppm) of diborane($B_2H_6$) is suplied to the microwave CVD device. The supplied gas mixture is resolved and excited by microwave energy (for example, 2450 MHz) into a plasma and the plasma precipitates and grows as the diamond semiconductor film 48 containing boron on the monocrystal plate 47. Thereafter, the metallic films 61 to 63 are formed on the upper surface of the semiconductor film 48 and the lower surface of the monocrystal plate 47 by evaporating or sputtering in sequence. The wires 52A to 52D are made of metal and can be easily connected to the gold film 63 of each of the electrodes 41 and 44 by wire bonding or a like method.

The pressure detector having the above described structure is secured to an engine cylinder wall in the screw portion 1a of the housing 1. The pressure of the cylinder is introduced into the sensing body 3 and is applied to the diaphragm 31. Then, the diaphragm is deformed in accordance with the pressure applied thereto and strain occurs in the strain gauges 4A and 4B positioned just above the diaphragm 311 and the resistance of the strain gauges 4A and 4B is substantially changed. At this time, strain does not occur in the other strain gauges 4C and 4D since they are formed away from the diaphragm 311, and accordingly, the resistance value thereof is not changed. When an electric source is supplied between terminals T1 and T2 in FIG. 3, a pressure signal corresponding to the amount of deformation namely, the fluid pressure within the cylinder is obtained between terminals T3 and T4.

The above-described pressure detector normally operates even in an atmosphere of a temperature as high as about 500° C. This is caused by the fact that the band gap of the diamond is as large as 5.5 eV in contrast with that of Si(about 1.1 eV) used in the conventional semiconductor strain gauge and diamond does not lose its characteristic as a semiconductor even at a high temperature.

The coefficient of thermal expansion of diamond is as small as about $2.3 \times 10^{-6}$/°C. at 100° C. so that there occurs a problem in joining the diamond monocrystal plate 47 and the diamond semiconductor film 48 to a metallic plate. According to the present invention, in order to prevent damage to the strain gauges due to the rapid heating which occurs at the time the engine is started, the conformable state of thermal expansion is maintained by using the titanium film, the platinum film and the gold film of which the coefficient of thermal expansion is gradually increased from the film adjacent to the monocrystal plate 47 and the semiconductor film 48. In this case, the coefficients of thermal expansion of titanium, platinum and gold are $8.8 \times 10^{-6}$/°C., $9.1\times10^{-6}/°C.$, and $14.2\times10^{-6}/°C.$, respectively at 100° C. The coefficient of thermal expansion of stainless steel is about $15\times10^{-6}/°C.$ at 100° C. which represents the coefficient of thermal expansion of metals in general.

The thermal conductivity of the diamond monocrystal plate 47 is very large and the electrically insulating property thereof is also very large. Therefore, each of the above-described strain gauges corresponds to the SOI structure of the Si semiconductor, and accordingly is profitably used in a high temperature atmosphere.

In the above embodiment, the strain gauges 4A to 4D are formed on the single diamond monocrystal plate 47. When the strain gauges 4A to 4D are required to be voluntarily disposed independently of one another, each of the strain gauges 4A to 4D may be provided on the flange portion 31 separately as shown in FIGS. 5 and 6 as a second embodiment.

Figure 5:
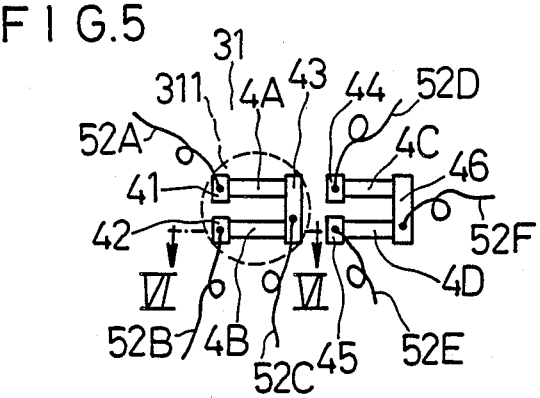
FIGS. 5 and 6 illustrate a second embodiment of the present invention.
Figure 6:
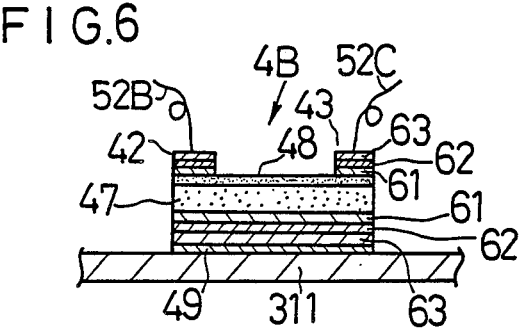

In FIG. 5, the strain gauges 4A to 4D are arranged on the flange portion 31. The strain gauges 4A and 4B are positioned directly above the diaphragm 311.

Each of the strain gauges 4A to 4D has the same structure. The strain gauges 4A and 4B have electrodes 41 and 42, respectively, and are connected to each other by a common electrode 43.

The strain gauges 4C and 4D have electrodes 44 and 45, respectively, and are connected to each other by a common electrode 46. To the electrodes 41 to 46 are connected wires 52A, 52B, 52C, 52D, 52E, 52F, respectively, whereby the strain gauges 4A to 4D compose a bridge circuit as shown in FIG. 3.

The structure of the strain gauge 4B is illustrated in FIG. 6 as a representative example. On the whole upper surface of the monocrystal plate 47 is formed a P-type diamond semiconductor film 48 containing boron(B) as an impurity. In both ends of the semiconductor film 48 are formed the electrodes 42 and 43. Each of these electrodes 42 and 43 is formed by piling the titanium film 61, the platinum film 62 and the gold film 63 on the semiconductor film 48. On the whole lower surface of the diamond monocrystal plate 47 is formed the titanium film 61, the platinum film 62 and the gold film 63 in sequence on the monocrystal plate 47. The gold film 63 is joined to the diaphragm 311 made of stainless steel through a brazing material 49. The other strain gauges 4A, 4C, and 4D have the same structure as that of the strain gauges 4B and are joined to the diaphragm 311 or the flange portion 31.

The strain gauge 4A to 4B are produced similarly to those of the first embodiment.

Figure 7:
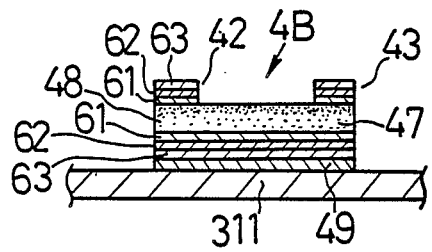
FIG. 7 is a sectional view of a strain gauge of the third embodiment according to the present invention.

FIG. 7 illustrate a third embodiment of the present invention. In FIG. 7, the diamond semiconductor film 48 is formed on the upper surface of the diamond monocrystal plate 47 by heat diffusion or ion injection. The third embodiment having the above structure also achieves an operating effect similar to that of the preceding embodiments.

Figure 8:
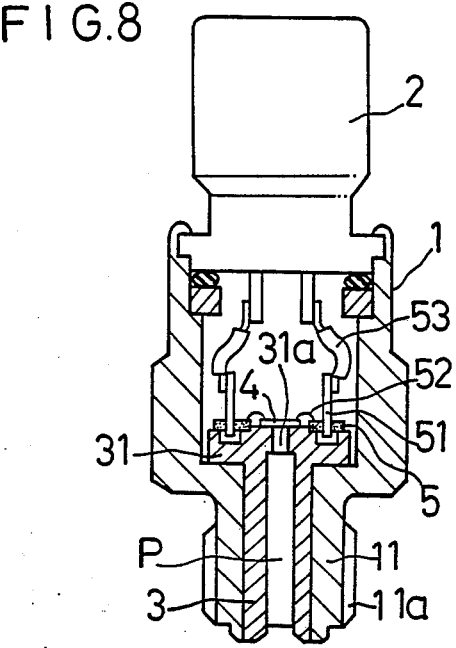
FIGS. 8 and 9 illustrate a fourth embodiment of the present invention
Figure 9:
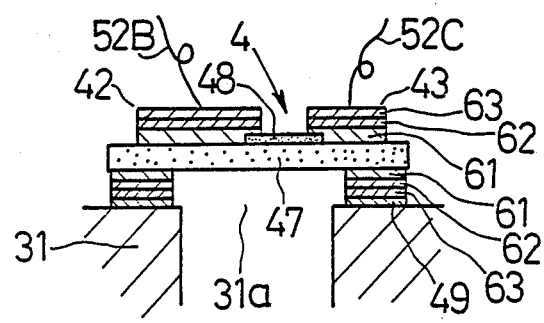

FIGS. 8 and 9 illustrate a fourth embodiment of the present invention. In the fourth embodiment, the diamond monocrystal plate itself is used as a diaphragm of the pressure detector.

In FIG. 8, an opening 31a is formed at the center of the flange portion 31 of the sensing body 3 and a strain gauge 4 having the structure similar to that of the first embodiment covers the opening 31a. In FIG. 9, on the lower surface of the monocrystal plate 47 opposed to the peripheral edge of the opening 31a are formed the titanium film 61, the platinum film 62, the gold film 63 in sequence. The gold film 63 is joined to the peripheral edge of the opening 31a through a brazing material 49. When a pressure to be measured is introduced, the diamond monocrystal plate 47 deforms in accordance with the introduced pressure. The fourth embodiment having the above described structure achieves an operational effect similar to that of the preceding embodiments.

In each of the preceding embodiments, the platinum film 62 out of the metallic films 61, 62 and 63 can be omitted when the pressure detector is used at a comparatively low temperature of about 400° C. And the electrodes 41, 42, 43, 44, 45 and 46 need not have a three-filmed structure. The titanium film 61 will suffice. In order to easily perform the connection of wires, the above-described three-filmed structure of which the outermost film is gold film 63 is preferable.

In each of the preceding embodiments, the diamond semiconductor film 48 may be formed by doping diamond with phosphor(P) for example into an N-type semiconductor.

The titanium film, the platinum film and the gold film can be also formed by the method of mixing a metallic powder with a solvent such as terupineol into a paste, pattern-printing the paste and firing the printed paste in an atmosphere of hydrogen, nitrogen or steam or by a dissolution injecting method.

What is claimed is:

1. A diamond-to-metal joint structure, comprising:
   a diamond body;
   a titanium film formed on said diamond body;
   a gold film formed on said titanium film; and
   a metallic body to which said gold film is joined.

2. A joint structure according to claim 1, wherein said diamond body is a diamond monocrystal body having formed thereon a diamond semiconductor containing an impurity.

3. A joint structure according to claim 2, wherein said diamond semiconductor is a P-type semiconductor containing boron as said impurity.

4. A joint structure according to claim 2, wherein said diamond semiconductor is a N-type semiconductor containing phosphor as said impurity.

5. A joint structure according to claim 1, wherein said titanium film is constituted by a condensate of evaporated titanium.

6. A joint structure according to claim 1, wherein said gold film is constituted by a condensate of evaporated gold.

7. A joint structure according to claim 1, wherein said titanium film is constituted by a sputtered coating of titanium.

8. A joint structure according to claim 1, wherein said gold film is constituted by a sputtered coating of gold.

9. A joint structure according to claim 1, wherein each of said titanium film and said gold film is formed by mixing one of a titanium powder and a gold powder with a solvent into a paste, pattern-printing said paste, and firing said pattern-printed paste within an atmosphere of a gas out of hydrogen, nitrogen and steam.

10. A joint structure according to claim 1, wherein said gold film is brazed to said metallic body.

11. A joint structure according to claim 1, wherein said gold film is wire bonded to said metallic body.

12. A diamond-to-metal joint structure, comprising:
   a diamond body;
   a titantium film formed on said diamond body;
   a platinum film formed on said titanium film;

a gold film formed on said platinum film; and
a metallic body to which said gold film is joined.

13. A joint structure according to claim 12, wherein said titanium film is constituted by a condensate of evaporated titanium.

14. A joint structure according to claim 12, wherein said platinum film is constituted by a condensate of evaporated platinum.

15. A joint structure according to claim 12, wherein said gold film is constituted by a condensate of evaporated gold.

16. A joint structure according to claim 12, wherein said titanium film is constituted by a sputtered coating of titanium.

17. A joint structure according to claim 12, wherein said platinum film is constituted by a sputtered coating of platinum.

18. A joint structure according to claim 12, wherein said gold film is constituted by a sputtered coating of gold.

19. A pressure detector comprising:
a cylindrical housing for projecting into an atmosphere the pressure of which is to be measured;
a pressure chamber formed within said housing, said housing further including introducing means by which pressure to be measured is introduced to said pressure chamber;
a metallic diaphragm formed on a surface of one portion of a wall defining said pressure chamber, which diaphragm is adapted to deform in accordance with changes in said pressure to be measured; and
a strain gauge provided on said diaphragm for generating an output signal corresponding to strain generated due to the deformation of said diaphragm;
said strain guage being comprises a diamond monocrystal plate and a diamond semiconductor film formed on said diamond monocrystal plate;
said diamond monocrystal plate being joined to said diaphragm through at least two films having graduated thermal expansion coefficients, including a titanium film and a gold film, which at least two films are piled on said diamond monocrystal plate in graduated sequence so as to provide a stepped transition in thermal expansion coefficient from said diamond monocrystal plate to said diaphragm.

20. A pressure detector according to claim 19, wherein a platinum layer is interposed between said titanium film and said gold film.

21. A pressure detector according to claim 19, further comprising a signal output electrode formed by a titanium film, a platinum film and a gold film which are piled on said diamond semiconductor film in sequence; signal wires being wirebonded to said gold film.

22. A pressure detector according to claim 19, wherein said diamond semiconductor film is a P-type semiconductor film containing boron as an impurity.

23. A pressure detector according to claim 19, wherein said diamond semiconductor film is a N-type semiconductor film containg phosphor as an impurity.

24. A pressure detector according to claim 22, wherein said diamond semiconductor film is formed by precipitating a plasma of a mixture gas composed of methane, hydrogen, and diborane( B H )on said diamond monocrystal plate.

25. A pressure detector according to claim 22, wherein said diamond semiconductor film is formed by introducing boron into said dimond monocrystal plate by a method out of a heat diffusing method and an ion injecting method.

26. A pressure detector comprising:
a cylindrical housing for projecting into an atmosphere the pressure of which is to be measured;
a pressure chamber formed within said housing, said housing further including introducing means by which pressure to be measured is introduced to said pressure chamber;
a diaphragm for covering an opening provided in a metallic wall defining said pressure chamber; said diaphragm being adapted for deforming in accordance with changes in the pressure to be measured; and
a strain gauge provided on said diaphragm for generating an output signal corresponding to strain generated due to the deformation of said diaphragm;
said diaphragm being made of a diamond monocrystal plate; said diamond monocrystal plate being joined to an opening edge of said pressure chamber through at least two films having graduated thermal expansion coefficients, including a titanium film and a gold film, which at least two films are formed on said diamond monocrystal plate in graduated sequence so as to provide a stepped transition in thermal expansion coefficient from said diamond monocrystal plate to said opening edge of said pressure chamber; said strain gauge comprising a diamond semiconductor film formed on said diaphragm.

27. A pressure detector according to claim 26, wherein a platinum layer is interposed between said titanium film and said gold film.

* * * * *